Patented Aug. 15, 1944

2,355,988

UNITED STATES PATENT OFFICE 2,355,988

WELD ROD COVERING

David L. Mathias, East Orange, N. J., assignor to Metal & Thermit Corporation, New York, N. Y., a corporation of New Jersey No Drawing. Application December 10, 1943, Serial No. 513,721

8 Claims. (Cl. 219—8)

This invention relates to covered weld rods designed to be used in electric arc welding. Such rods consist of a metal rod or heavy wire covered with a substance which will decompose in the heat of the welding arc to form a slag or a protecting envelope of gas or both to prevent contamination of the weld metal by atomospheric gases.

A covered weld rod designed for "all position welding," which means welding overhead and along vertically disposed seams as well as "down hand" welding on substantially horizontal seams, must form little slag. It is desirable in "all position welding" to have the metal solidify quickly and this is prevented by a heavy coat of slag which acts as an insulator and prevents rapid cooling. The "all position welding" rod must effectually protect the weld metal from contamination by the atmosphere during the welding operation to insure sound and ductile welds. Effective protection may be had by the use of a substantial percentage of carbohydrates in the electrode coating. Upon decomposition during welding, such a coating forms a gaseous envelope on the arc stream, yet produces little or no slag.

Carbohydrates, represented by the formula $C_6H_{10}O_5$, might decompose to form $5CO$ plus $5H_2$ plus $1C$ if heat of sufficient intensity were applied quickly enough to produce substantially instantaneous decomposition. During welding, however, the carbohydrates heretofore used slowly undergo low temperature decomposition in the unused portion of the electrode coating due to heating of the core wire by resistance and conduction. During this low temperature decomposition, the carbohydrate loses water and there is left behind an organic residue of much higher carbon content than the original carbohydrate. As the electrode is consumed, the flux or covering progressively becomes richer in carbon (as such), and this carbon is transferred to the weld metal deposits instead of being converted to the protective carbon monoxide gas. The carbon which is transferred to the weld metal reacts with oxides that are present and produces porosity within the weld or, produces weld metal of a higher carbon content.

Decomposition of the carbohydrate does not begin until substantially all the free moisture retained in the binder is evaporated off. This, however, is usually accomplished before the covering reaches the arc end of the electrode so that continued exposure to heat after the free moisture has been removed from the flux coating results in the rapid decomposition of the carbohydrate itself, resulting in the production of a substantial amount of carbon in the crucible at the arcing end of the electrode.

I have found that the transfer of carbon with consequent weld porosity or increase in the carbon content of the weld metal can be prevented by converting the carbon to a gaseous form before it reaches the weld metal. In my invention, this is accomplished by the use of hydrates which retain a substantial part of their water until subjected to temperatures sufficiently high (in the neighborhood of 700° F.) to permit the well known water gas reaction $(C+H_2O=CO+H_2)$. If such a hydrate is used in combination with carbohydrates in the electrode coating, the release of a substantial part of the water vapor does not take place until the covering reaches the vicinity of the arc end of the electrode where such vapor is decomposed into hydrogen and oxygen and the latter unites with the carbon to form carbon monoxide. It is essential that the hydrate used be one which will not release its water until the flux coating is subjected to a high temperature, because it is only at high temperatures that the water gas reaction goes to satisfactory completion.

I have found that I can successfully use brucite, a hydrated mineral magnesium oxide, having the formula $Mg(OH)_2$, as an ingredient of my coating. Brucite gives off most of its water content at a temperature just over 700° F. Other mineral hydrates can be used, providing they hold their water up to temperatures wherein the water and carbon will change to carbon monoxide and hydrogen and providing they do not adversely affect the performance of the electrode by impairing arc action or slag characteristics. Hydrates of manganese oxide and/or iron oxide do not give up their water until a high temperature is reached and for that reason are useful to maintain the hydration of the coating, but the resultant oxides produce more "spatter" and a somewhat erratic arc action and therefore are not as desirable as brucite because of these characteristics. The value of brucite lies in its ability to hold its water of combination until heated to about 700° F. as well as a resultant magnesium oxide which is useful as an ingredient in the flux coating.

The point of decomposition of brucite to liberate water as steam is a region somewhat removed from the tip or arcing end of the electrode where the water gas reaction takes place. The position or location of that region where the temperature reaches 700° F., or sufficiently high enough to decompose brucite, depends upon the resistance and thermal characteristics of the core wire, characteristics of the flux coating and conditions of use of the electrode. From the point of generation, the steam is conducted by the flux coating to the point of water gas reaction with carbon resulting from destructive decomposition of the cellulose.

The amount of brucite or other suitable hydrate required to produce the desired results varies over quite a range and the amount would be controlled by the amount of water available on temperature decomposition; by the nature and amounts of the other flux constituents present and by the conditions of processing the electrode. A specific example of a workable flux composition in which brucite is used is as follows:

| | Parts by weight |
|---|---|
| Cellulose | 250 |
| Brucite | 126 |
| Ferromanganese | 126 |
| Titanium oxide (TiO₂) | 158 |
| Silica | 97 |
| Sodium silicate (liquid) | 859 |

The cellulose is of a grade sold commercially as Alpha Flock or Alpha cellulose and the bulk or specific volume at 5 to 8 per cent water content would be about 3.3 cc. per gram when tamped to constant volume.

Sodium silicate best suited for the above flux has a ratio of $1Na_2O$ to $3.25\ SiO_2$ and a specific gravity of 1.415 (42° Baumé). The brucite is mineral magnesium hydrate and should be ground to 100 mesh or finer. A typical analysis of brucite is as follows:

| | Percent by weight |
|---|---|
| Ignition loss (water) | 31.50 |
| $SiO_2$ | 3.00 |
| CaO | 1.75 |
| $R_2O_3$ | 1.00 |
| Magnesium oxide (MgO) | 62.75 | where $R_2$ represents a metal, such as aluminum.

In using the above described fluxing compound, the dry components are thoroughly mixed together, after which the liquid binder is added. This mixture is then extruded upon the core wire and dried at a rate which will retain the maximum amount of moisture and will not blister the rod covering.

It will be understood that the specific formula given is but one example of the use of brucite or other hydrate and cellulose in an electrode coating. Other proportions of brucite or other suitable mineral hydrates or mixtures thereof, together with cellulose or other carbohydrates and other flux ingredients may be used and these variations will depend upon variables such as coating thickness, diameter of electrode, method of processing, etc.

| | 1 | | 2 | | 3 | |
|---|---|---|---|---|---|---|
| | Parts by weight | Per cent | Parts by weight | Per cent | Parts by weight | Per cent |
| Carbohydrate | 400 | 22 | 400 | 21.5 | 400 | 20.5 |
| Brucite | 32 | 1.8 | 90 | 4.8 | 180 | 9.3 |
| Ferromanganese | 180 | 10.0 | 180 | 9.7 | 180 | 9.3 |
| Titanium dioxide | 225 | 12.5 | 225 | 12.0 | 225 | 11.6 |
| Silica | 103 | 5.7 | 103 | 5.5 | 103 | 5.3 |
| Sodium silicate | 860 | 48 | 860 | 46.5 | 860 | 44.0 |
| Total | 1,800 | 100.0 | 1,858 | 100.0 | 1,948 | 100.0 |

In general the carbohydrate may vary from about 2 to 30 per cent by weight and the brucite from about 1 per cent to about 15 per cent by weight. The preferred range of ratios of brucite to carbohydrate is from about 1:2 to 1:12, certain preferred specific ratios being 1:2, 1:4 and 1:12, respectively.

It will be understood that the brucite-carbohydrate combination can be used with slag forming compositions in general and is not limited to use with the specific components set forth in the specific formulae shown. While carbohydrate in general may be used, cellulose is the preferred species.

This application is a continuation-in-part of my co-pending application Serial No. 425,519.

What I claim as new and desire to secure by Letters Patent of the United States is:

1. A covering for an arc welding electrode comprising about 5 per cent to about 30 per cent carbohydrate and about 2 per cent to about 15 per cent brucite by weight.

2. A covering for an arc welding electrode comprising about 5 per cent to about 30 per cent cellulose and about 2 per cent to about 15 per cent brucite by weight, the ratio of brucite to cellulose varying from about 1:2 to about 1:12.

3. A covering for an arc welding electrode comprising about 5 per cent to about 30 per cent cellulose and about 2 per cent to about 15 per cent brucite by weight, the ratio of brucite to cellulose being about 1 to 2.

4. A covering for an arc welding electrode comprising about 5 per cent to about 30 per cent cellulose and about 2 per cent to about 15 per cent brucite by weight, the ratio of brucite to cellulose being about 1 to 4.

5. A covering for an arc welding electrode comprising about 5 per cent to about 30 per cent cellulose and about 2 per cent to about 15 per cent brucite by weight, the ratio of brucite to cellulose being about 1 to 12.

6. In a covering for an arc welding electrode:

| | Parts by weight |
|---|---|
| Cellulose | 250 |
| Brucite | 126 |
| Ferromanganese | 126 |
| Titanium oxide | 158 |
| Silica | 97 |
| Sodium silicate | 859 |

7. A covering for an arc welding electrode comprising about 5 per cent to about 30 per cent carbohydrate and about 2 per cent to about 15 per cent magnesium hydroxide by weight.

8. A covering for an arc welding electrode comprising about 5 per cent to about 30 per cent cellulose and about 2 per cent to about 15 per cent brucite by weight, the ratio of brucite to cellulose varying from about 1:2 to about 1:12.

DAVID L. MATHIAS.